Patented Apr. 13, 1954

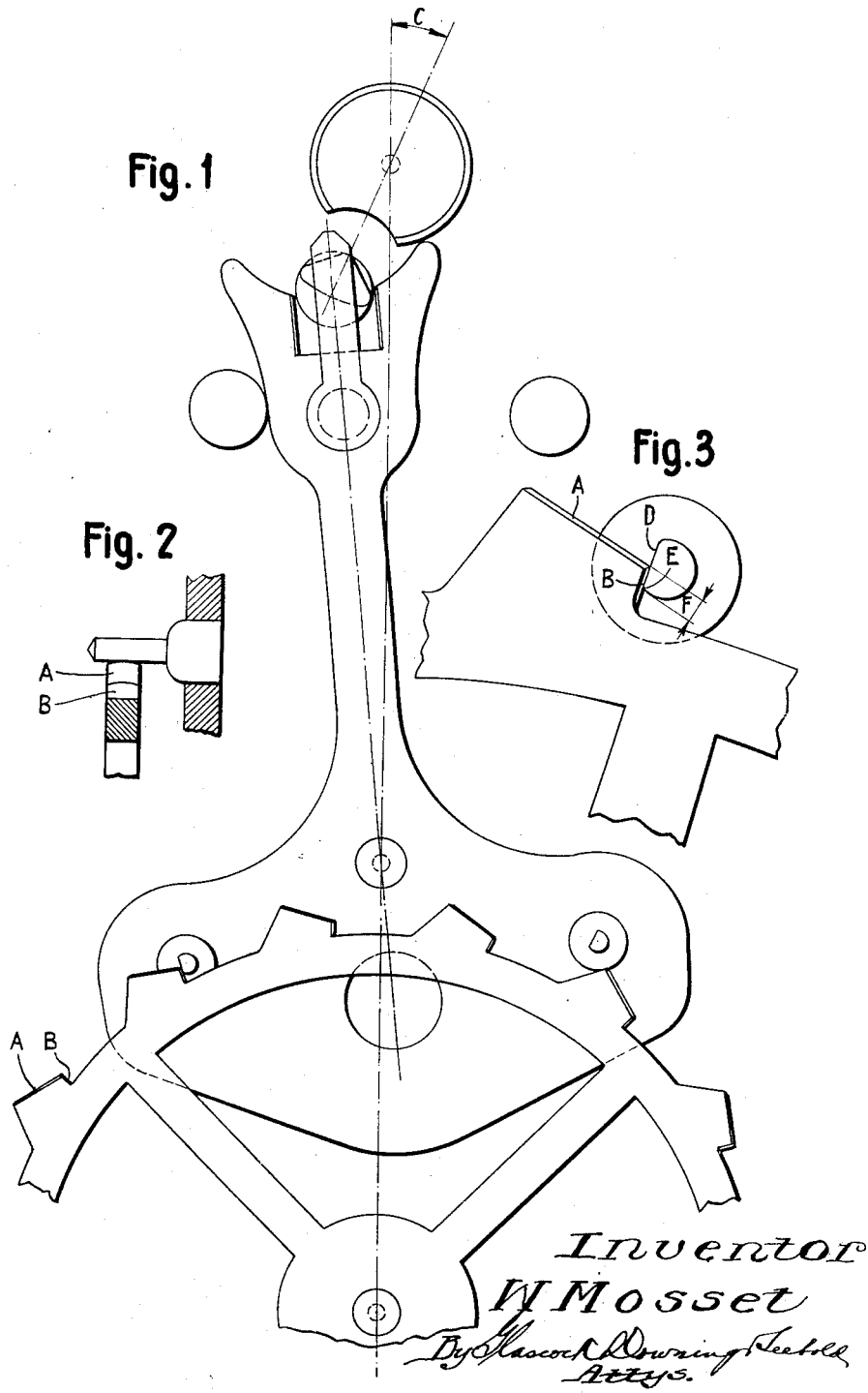

2,674,890

UNITED STATES PATENT OFFICE 2,674,890

PIN-PALLET ESCAPEMENT

William Mosset, Holstein, Switzerland

Application July 20, 1949, Serial No. 105,834

Claims priority, application Switzerland
July 22, 1948

3 Claims. (Cl. 74—1.5)

In the pin-pallet escapements the teeth of the escape wheel are generally milled, so that the impulse faces and the locking faces of these teeth are wide and unclean. If the escape wheel does not run true or if the pins are not exactly right angled, the pins will rub at one time against the entire width of the impulse face or the locking face, at another time only against an edge, whereby an irregular friction occurs. On the other hand, round pins are generally used, so that each pin has on the corresponding locking face a sliding way depending upon its diameter for reaching the impulse face and thus produces a large balance arc between the impulse pin or finger and the fork. This causes an unfavorable power transmission to be effected from the balance to the pallet.

It is therefore an essential object of this invention to overcome the above mentioned difficulties by providing, in a pin-pallet escapement mechanism of the type in which pins mounted on the escape lever successively engage locking and impulse faces on the teeth of the escape wheel, an improved structure which decreases wear of the escape wheel teeth when they are not made of steel, improves the sliding contact between pins and teeth, and further minimizes the removal of oil film from the faces of the teeth which consists in providing pins having a cross-sectional shape including a straight line portion, that is in effect perpendicular to the direction of movement of the wheel and at each end of this straight line portion a curved portion constituting transition curves.

Another object of this invention, in order to overcome the difficulties mentioned above, consisting of providing a pin-pallet escapement in which the impulse faces and the locking faces of the escape wheel teeth are convex in a plane perpendicular to the plane of the wheel and the pins are formed with plane faces adapted to come into contact with the locking faces of said teeth.

The accompanying drawings show an illustrative embodiment of the invention.

Fig. 1 is a plan view of the escapement.

Fig. 2 is a side view of the escape wheel with a pin.

Fig. 3 is a plan view showing a tooth of the escape wheel with a pin.

Referring to the drawings, A denotes the impulse face and B the locking face of a tooth of the escape wheel. These faces are convex and polished, as best shown in Fig. 2. The pins are formed with a plane impulse face D having two rounded corners or transition curves with the radius E.

Owing to the convex and polished impulse and locking faces A and B of the escape wheel teeth, a small and uniform friction between the escape wheel and the pin is obtained, even if the escape wheel does not run true or if the pin is not right angled.

With reference to the drawing, it is pointed out that in the pin-pallet escapement mechanism, the escape wheel permitted to move only intermittently and simultaneously, during each rotation imparts a turning movement to the pallets or pins which moves the escape lever and thus the balance wheel. It is further clear that in this movement, the pins enter ultimately into gaps between the teeth of the escape wheel. Starting from the position of Figure 1, the escapement wheel turns clockwise which results in the left-hand pin, illustrated on an enlarged scale in Figure 3, sliding upwardly on the locking surface B until it has reached the edge of the tooth, whereupon the escape wheel is released and the pin receives an impulse from the slanting surface of the impulse face A. In the meantime, the right-hand pin has passed into the gap between two teeth on the escape wheel and thus limits rotation of this wheel by engagement with the locking face B of the next tooth. It is thus clear that there is mutual engagement or contact between the pins and both faces of the teeth of the escapement wheel.

The provision of the flat face D on each pin has the advantage that the depth of engagement F, Figure 3, is very small when compared with the depth of engagement when a circular pin is used. This small depth of engagement has a tendency to minimize friction because the path of sliding engagement between the face D of the pin and the face B of each tooth is smaller and furthermore, the angle of swing of the lever, from locking to what is termed the lease position of the pins, is smaller so that a small balance arc C is obtained. During the swinging motion of the lever, the rounded transition curves E slides on the impulse face of the wheel and with these rounded surface minimizes the removal of oil film from the face of the teeth since oil in an increased degree will tend to adhere to the pins. It is a well known fact that in the pin-pallet escapement mechanism, lubrication is of paramount importance because there is always the danger that the oil will be wiped or scraped off the teeth of the escape wheel.

It is therefore clear that my invention provides in a pin-pallet escapement mechanism for time pieces and for cooperation with an escape wheel having teeth thereon each embodying an impulse and a locking face, a pivotally mounted escape lever disposed in a plane displaced from the plane of the wheel and having spaced pins projecting from the face of the lever adjacent the wheel and lying in the path of movement of the teeth of the wheel. Each of these pins has a cross sectional shape including a straight line portion D perpendicular to the direction of movement of the wheel, which is clockwise as viewed in the drawing, and at each end of this straight line portion a curved portion E constituting transition curves so that when the pins successively engage the locking and impulse faces of the teeth the relative sliding movement between the mutually contactable surfaces of pins and teeth is facilitated and removal of oil film from the faces of the teeth, particularly the impulse faces, is minimized.

What I claim is:

1. In a pin-pallet escapement mechanism for time pieces for cooperation with an escape wheel having teeth thereon each embodying an impulse and a locking face, a pivotally mounted escape lever disposed in a plane displaced from the plane of the wheel, spaced pins projecting from the face of the lever adjacent the wheel and lying in the path of movement of the teeth of the wheel, each of said pins having a cross-sectional shape including a straight line portion perpendicular to the direction of movement of the wheel, and at each end of said straight line portion a curved portion constituting transition curves so that when the pins successively engage the locking and impulse faces of the teeth the relative sliding movement between mutually contactable surfaces of pins and teeth is facilitated and removal of oil film from the faces of the teeth is minimized.

2. In a pin-pallet escapement mechanism for time pieces for cooperation with an escape wheel having teeth thereon each embodying an impulse and a locking face, a pivotally mounted escape lever disposed in a plane displaced from the plane of the wheel, spaced pins projecting from the face of the lever adjacent the wheel and lying in the path of movement of the teeth of the wheel, each of said pins having a planar surface perpendicular to the direction of movement of the wheel, and said impulse and locking faces of the teeth constituting convex surfaces in a plane perpendicular to the plane of the wheel so that when the pins successively engage the locking and impulse faces of the teeth the relative sliding movement between mutually contactable surfaces of pins and teeth is facilitated and removal of oil film from the faces of the teeth is minimized.

3. In a pin-pallet escapement mechanism for time pieces for cooperation with an escape wheel having teeth thereon each embodying an impulse and a locking face, a pivotally mounted escape lever disposed in a plane displaced from the plane of the wheel, spaced pins projecting from the face of the lever adjacent the wheel and lying in the path of movement of the teeth of the wheel, each of said pins having a cross-sectional shape including a straight line portion perpendicular to the direction of movement of the wheel, at each end of said straight line portion a curved portion constituting transition curves, and said impulse and locking faces of the teeth constituting convex surfaces in a plane perpendicular to the plane of the wheel so that when the pins successively engage the locking and impulse faces of the teeth the relative sliding movement between mutually contactable surfaces of pins and teeth is facilitated and removal of oil film from the faces of the teeth is minimized.

References Cited in the file of this patent

UNITED STATES PATENTS

| Number | Name | Date |
|---|---|---|
| 247,721 | Wensch | Sept. 21, 1881 |
| 443,684 | Riefler | Dec. 30, 1890 |
| 618,272 | Johnson | Jan. 24, 1899 |
| 740,179 | Reaves | Sept. 29, 1903 |
| 856,091 | Ohlson | June 4, 1907 |
| 1,060,814 | Burgum | May 6, 1913 |
| 1,327,226 | De Long | Jan. 6, 1920 |
| 1,517,008 | Jones | Nov. 25, 1924 |
| 2,385,011 | Lurtz | Sept. 18, 1945 |